(12) United States Patent
Saffran

(10) Patent No.: US 9,814,359 B2
(45) Date of Patent: Nov. 14, 2017

(54) PAPER PRODUCT DISPENSING SYSTEM AND RELATED METHODS

(71) Applicant: SCA HYGIENE PRODUCTS AB, Göteborg (SE)

(72) Inventor: Kenneth Ernest Saffran, Little Chute, WI (US)

(73) Assignee: SCA HYGIENE PRODUCTS AB, Göteborg (SE)

(*) Notice: Subject to any disclaimer, the term of this patent is extended or adjusted under 35 U.S.C. 154(b) by 0 days.

(21) Appl. No.: 15/195,060

(22) Filed: Jun. 28, 2016

(65) Prior Publication Data

US 2016/0338552 A1 Nov. 24, 2016

Related U.S. Application Data

(62) Division of application No. 13/455,365, filed on Apr. 25, 2012, now Pat. No. 9,398,833.

(51) Int. Cl.
| | |
|---|---|
| *G06F 17/00* | (2006.01) |
| *A47K 10/38* | (2006.01) |
| *A47K 10/42* | (2006.01) |
| *G06Q 20/04* | (2012.01) |
| *G07G 1/14* | (2006.01) |
| *G07G 5/00* | (2006.01) |
| *G07F 13/10* | (2006.01) |
| *A47K 10/32* | (2006.01) |

(52) U.S. Cl.
CPC .............. *A47K 10/38* (2013.01); *A47K 10/32* (2013.01); *A47K 10/42* (2013.01); *G06Q 20/045* (2013.01); *G07F 13/10* (2013.01); *G07G 1/14* (2013.01); *G07G 5/00* (2013.01); *A47K 2010/389* (2013.01)

(58) Field of Classification Search
CPC .......... A47K 10/32; A47K 10/42; G07G 1/14; G06Q 20/045
USPC ......................... 700/232, 236, 240
See application file for complete search history.

(56) References Cited

U.S. PATENT DOCUMENTS

| | | | |
|---|---|---|---|
| 2,092,166 A | 9/1937 | Kettles | |
| 2,337,065 A | 12/1943 | Price | |
| 4,654,513 A * | 3/1987 | Hennessy | ............ G06Q 20/342 221/194 |
| 5,088,586 A * | 2/1992 | Isobe | ................... G06Q 20/203 194/205 |
| 5,371,346 A | 12/1994 | Menoud | |

(Continued)

OTHER PUBLICATIONS

Russian Decision on Grant dated Mar. 14, 2016, issued in corresponding Russian patent application No. 2014147051 (10 pages) and its English-language translation (5 pages).

(Continued)

*Primary Examiner* — Michael K Collins
(74) *Attorney, Agent, or Firm* — Drinker Biddle & Reath LLP

(57) ABSTRACT

A system for dispensing paper product at a food-selling establishment. The system includes a point-of-sale device for entering details of a particular sale transaction, with the point-of-sale device being configured to output a slip containing specific indicia associated with the particular sale transaction. A dispenser of paper product is configured to obtain information from the specific indicia on the slip and to dispense a predetermined quantity of paper product in response to the obtained information.

15 Claims, 4 Drawing Sheets

(56) References Cited

U.S. PATENT DOCUMENTS

| | | | |
|---|---|---|---|
| 5,415,264 A | 5/1995 | Menoud | |
| 6,419,136 B2 | 7/2002 | Formon et al. | |
| 6,440,052 B1 | 8/2002 | Reider et al. | |
| 6,519,505 B2 | 2/2003 | Formon | |
| 6,704,616 B2 | 3/2004 | Formon | |
| 6,837,395 B2 | 1/2005 | Windorski et al. | |
| 7,389,919 B2 | 6/2008 | Walker et al. | |
| 7,493,190 B1* | 2/2009 | Tomassi | G06Q 20/40145 221/13 |
| 7,581,676 B2* | 9/2009 | Skor | G06Q 20/20 235/380 |
| 7,774,096 B2 | 8/2010 | Goerg et al. | |
| 7,783,380 B2 | 8/2010 | York et al. | |
| 8,160,742 B2 | 4/2012 | Goerg et al. | |
| 9,398,833 B2* | 7/2016 | Saffran | A47K 10/32 |
| 2002/0175515 A1 | 11/2002 | Brown et al. | |
| 2003/0120382 A1* | 6/2003 | Formon | B65H 26/06 700/232 |
| 2003/0150907 A1 | 8/2003 | Metcalf et al. | |
| 2003/0205896 A1 | 11/2003 | Geiger et al. | |
| 2003/0220712 A1* | 11/2003 | Butikofer | G06Q 20/123 700/235 |
| 2003/0222135 A1 | 12/2003 | Stoutenburg et al. | |
| 2004/0099678 A1 | 5/2004 | Windorski et al. | |
| 2005/0171634 A1 | 8/2005 | York et al. | |
| 2005/0234776 A1 | 10/2005 | Jacoves et al. | |
| 2006/0157560 A1 | 7/2006 | Skor et al. | |
| 2007/0239545 A1 | 10/2007 | Mothwurf | |
| 2008/0019489 A1 | 1/2008 | Lynn | |
| 2010/0076596 A1 | 3/2010 | Graham et al. | |
| 2010/0114366 A1 | 5/2010 | Case et al. | |
| 2010/0211218 A1* | 8/2010 | Breitenbach | G06Q 10/087 700/237 |
| 2010/0224647 A1 | 9/2010 | Formon et al. | |
| 2010/0268381 A1 | 10/2010 | Goerg et al. | |
| 2011/0172814 A1 | 7/2011 | Breitenbach et al. | |
| 2012/0138625 A1* | 6/2012 | Case | A47K 10/42 221/30 |
| 2013/0289765 A1 | 10/2013 | Saffran | |

OTHER PUBLICATIONS

International Preliminary Report on Patentability dated Nov. 6, 2014, issued in International Patent Application No. PCT/EP2013/058061, filed Apr. 18, 2013 (6 pages).

International Search Report and Written Opinion dated Jul. 25, 2013, issued in International Patent Application No. PCT/EP2013/058061, filed Apr. 18, 2013.

European Office Action dated Aug. 2, 2016 issued in counterpart European patent application No. 13 716 804.3 (8 pages).

Third Chinese Office Action dated Feb. 15, 2017 issued in counterpart Chinese patent application No. 201380022375.1 (8 pages) and its English-language translation thereof (11 pages).

Chinese Office Action dated Oct. 31, 2016 issued in counterpart Chinese patent application No. 201380022375.1 (8 pages) and its English-language translation thereof (11 pages).

* cited by examiner

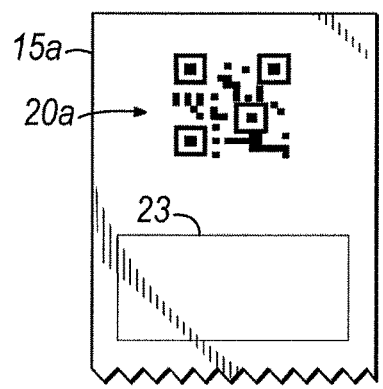
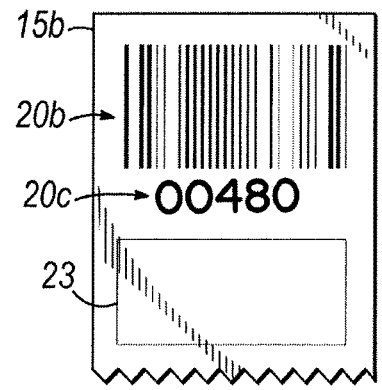
FIG. 2         FIG. 3
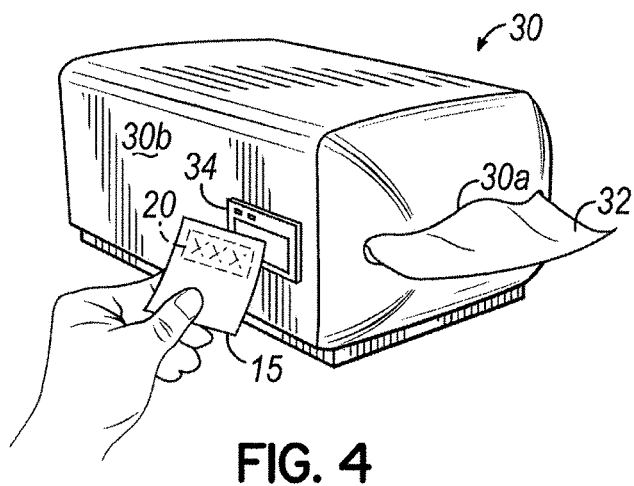
FIG. 4
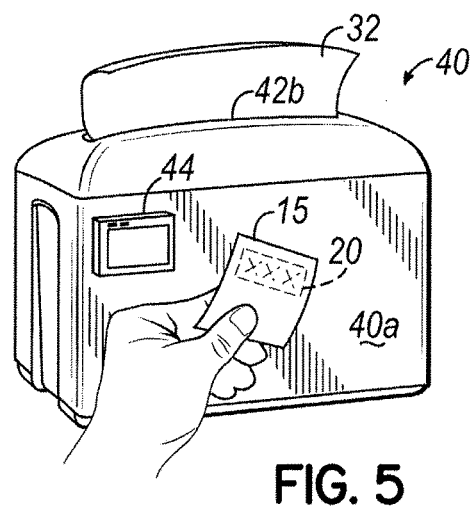
FIG. 5

PAPER PRODUCT DISPENSING SYSTEM AND RELATED METHODS

CROSS-REFERENCE TO PRIOR APPLICATION

This application is a divisional application of pending prior U.S. patent application Ser. No. 13/455,365, filed Apr. 25, 2012, which is herein incorporated by reference in its entirety.

TECHNICAL FIELD

The present invention is generally related to dispensers and, more particularly, to dispensers of paper product and methods for dispensing such paper product.

BACKGROUND

Retail operations and, more specifically, food establishments such as cafeterias, convenience stores, and fast-food restaurants that sell food items, are known to furnish paper product with the food items being sold. This paper product, such as napkins or paper towels, is furnished so that the customers may be able to wipe their hands and faces during and/or after consumption of the food items being purchased by them.

Some food establishments make manual dispensers available in or around the point-of-sale and/or eating areas in which the food items are typically consumed. In operations of that type, the food establishment has no control over the number of paper product taken by each customer. This often results in customers taking more paper product than are necessary to wipe their hands and/or faces during or after consuming the food items that are purchased from the food establishment. Unused paper product are often found at tables or other areas of the establishment and discarded. Alternatively, customers may take extra paper product, either to carry on their persons or to take to their offices or automobiles, all of which adds to the operating costs of the establishment.

In an attempt to prevent the waste of paper product associated with manual dispensing, some food establishments have stopped providing manual, customer accessible dispensers, and instead now rely on their cashiers to dispense the paper product. Unfortunately, it is difficult for cashiers to accurately and quickly control the amount of paper product provided to customers, and also difficult to provide customers a quantity of paper product that is commensurate with the purchased food items. Manual dispensing of paper product in operations of this type is consequently ineffective, wasteful, and/or may lead to dissatisfaction on the part of customers. Additionally, manual dispensing of paper product by cashiers forces cashiers to consume time that would otherwise be spent taking orders. This results in a less-than-ideal speed of service, which may also lead to customer dissatisfaction.

Systems have been proposed, in which a direct connection is established between a cash register and a paper roll dispenser, so that the dispenser dispenses a predetermined number of paper sheets automatically, based on a command received directly from the cash register. A problem observed with those systems, however, is that the task of collecting the paper sheets still falls on the cashier or other attendants at the food establishment. This consumes valuable time, which in turn slows down service.

Accordingly, it is desirable to provide systems and methods for dispensing paper product that address these and other shortcoming associated with dispensing of paper product at food establishments.

SUMMARY

In one embodiment, a system is provided for dispensing paper product at a food-selling establishment. The system includes a point-of-sale device for entering details of a particular sale transaction, with the point-of-sale device being configured to output a slip containing specific indicia associated with the particular sale transaction. A dispenser of paper product is configured to obtain information from the specific indicia on the slip and to dispense a predetermined quantity of paper product in response to the obtained information.

In specific embodiments, the point-of-sale device is configured to place on the slip machine-readable indicia, and the dispenser is configured to read the machine-readable indicia to thereby obtain the information. Additionally, the point-of-sale device may be configured to place on the slip indicia in the form of a barcode, and the dispenser may have a barcode reader that is configured to read the barcode to thereby obtain the information. The system may, in specific embodiments, include a point-of-sale device that is configured to place on the slip indicia in the form of a human-readable code, and a dispenser that includes a human interface for entering the human readable code, with the dispenser being configured to dispense the predetermined quantity of paper product in response to information obtained through the human interface.

The dispenser may be configured to dispense paper from a roll mounted therein, with the dispenser being further configured to dispense a predetermined length of paper from the roll in response to the obtained information. Alternatively, the dispenser may be configured to dispense napkins from a stack of napkins supported therein, with the dispenser being further configured to dispense a predetermined number of napkins in response to the obtained information. Additionally or alternatively, the dispenser may be configured to obtain information from the specific indicia more than once, with the dispenser being further configured to dispense the predetermined quantity of paper product only the first time the information is obtained from the specific indicia.

In specific embodiments, the dispenser includes a tray, and the dispenser is configured to deposit the predetermined quantity of paper product onto the tray in response to the obtained information. The dispenser may be configured to make the predetermined quantity of paper product retrievable by a user thereof from within the dispenser in response to the obtained information. The point-of-sale device may be a cashier register or some other type of point-of-sale device. The dispenser, in specific embodiments, is one of a plurality of interconnected dispensers, each configured to obtain information from the specific indicia on the slip and to dispense a predetermined quantity of paper product in response to the obtained information.

In another embodiment, a system is provided for dispensing napkins at a food-selling establishment. The system includes a register for entering details of a particular sale transaction, and a dispenser of napkins. The register is configured to output a slip containing a barcode associated with the particular sale transaction, and the dispenser of napkins is configured to read the barcode from the slip and to dispense a predetermined number of napkins in response to the read barcode.

In yet another embodiment, a system is provided for dispensing paper product at a food-selling establishment. A point-of-sale device is used for entering details of a particular sale transaction, and is configured to output a portable display containing specific indicia associated with the particular sale transaction. The system also includes a dispenser of paper product configured to obtain information from the specific indicia on the display and to dispense a predetermined quantity of paper product in response to the obtained information. The display may be located on a packaging element associated with a food item that is sold as part of the particular sale transaction. Alternatively, the point-of-sale device may be configured to generate an image on a mobile device, with the image including the specific indicia, and the dispenser may be configured to read the specific indicia on the mobile device and to dispense a predetermined quantity of paper product in response to the obtained information.

In another embodiment, a dispenser is provided for dispensing paper product. The dispenser includes a main housing configured for supporting paper product therein, and an input device for receiving information directly from a user of the dispenser. The dispenser is configured to dispense a predetermined quantity of paper product in response to the received information. The input device may include a barcode reader or some other type of optical reader, for example. Alternatively or additionally, the input device may include a panel configured for manually receiving information from a user of the dispenser.

In another embodiment, a method is provided for dispensing paper product at a food-selling establishment that has a point-of-sale device and at least one dispenser of paper product. The method includes entering information associated with a particular sale transaction into the point-of-sale device and outputting a slip containing specific indicia associated with the particular sale transaction. Information from the specific indicia on the slip is obtained in the dispenser, and a predetermined quantity of paper product is dispensed from the dispenser in response to the obtained information.

The method may include the point-of-sale device outputting a slip containing machine-readable indicia associated with the particular sale transaction, and the dispenser reading the machine-readable indicia from the slip. In specific embodiments, the method includes outputting a slip containing a barcode associated with the particular sale transaction, and the dispenser reading the barcode from the slip to obtain the information. Additionally or alternatively, the method may include outputting a slip containing a human-readable code associated with the particular sale transaction, and obtaining the human-readable code from the slip in the dispenser.

In specific embodiments, dispensing a predetermined quantity of paper product from the dispenser includes dispensing a predetermined length of paper from a roll supported in the dispenser. In other embodiments, dispensing a predetermined quantity of paper product from the dispenser includes dispensing a predetermined number of napkins from a stack of napkins supported in the dispenser. The method may also include obtaining information in the dispenser from the specific indicia on the slip a second time, recognizing that paper product has previously been dispensed by the dispenser in response to information obtained from the specific indicia, and withholding paper product from being dispensed by the dispenser in response to that recognition.

In other specific embodiments, dispensing a predetermined quantity of paper product from the dispenser includes the dispenser transferring the paper product onto a tray for retrieval by a user. Dispensing a predetermined quantity of paper product from the dispenser may alternatively include making the predetermined quantity of paper product available for retrieval from within the dispenser. In other embodiments, the method includes receiving and storing the slip into the interior of the dispenser.

In another embodiment, a method is provided for dispensing paper product at a food-selling establishment that has a point-of-sale device and at least one dispenser of paper product. The method includes entering information associated with a particular sale transaction into the point-of-sale device, and outputting a portable display containing specific indicia associated with the particular sale transaction. Information is obtained in the dispenser from the specific indicia on the portable display, and a predetermined quantity of paper product is dispensed from the dispenser in response to the obtained information.

BRIEF DESCRIPTION OF THE DRAWINGS

The objectives and features of the invention will become more readily apparent from the following detailed description taken in conjunction with the accompanying drawings in which:

FIG. 2 is a top view of a slip produced by a point-of-sale device of the system of FIG. 1.

FIG. 3 is a top view of a slip produced by a point-of-sale device of the system of FIG. 1, in accordance with another embodiment of the invention.

FIG. 4 is a perspective view of a dispenser of paper product in accordance with one embodiment of the invention.

FIG. 5 is a perspective view of a dispenser of paper product in accordance with another embodiment of the invention.

DETAILED DESCRIPTION

To the extent that any meaning or definition of a term in this written document conflicts with any meaning or definition of the term in a document incorporated by reference, the meaning or definition assigned to the term in this written document shall govern. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
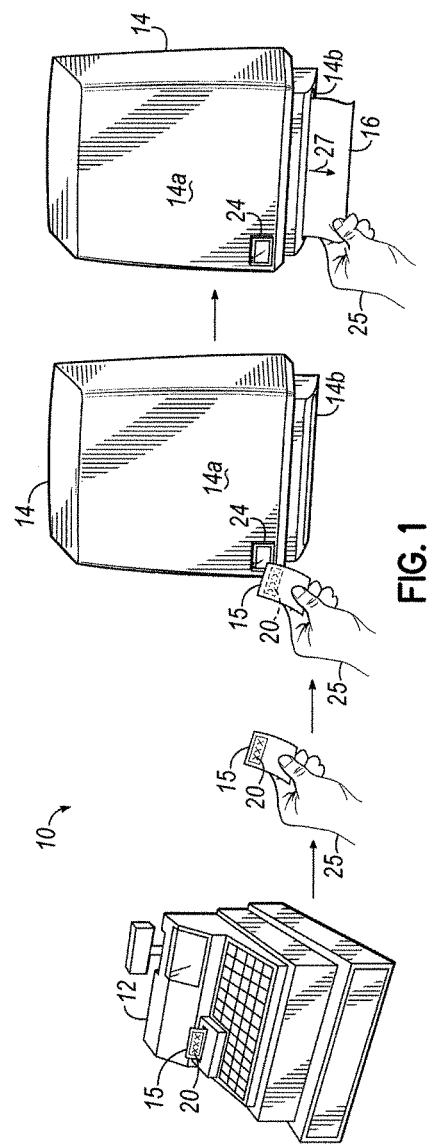
FIG. 1 is a perspective view of a system and method for dispensing paper product in accordance with one embodiment of the invention.

With reference to the figures, and more particularly to FIG. 1, an exemplary system 10 is illustrated for dispensing paper product at a food-selling establishment, such as a fast-food restaurant, a cafeteria, or a delicatessen. System 10 includes a point-of-sale device 12 and a dispenser 14 of paper product 16. As used herein, the term "paper product" and related terms refer to a thin substrate made of cellulose fiber paper, and also refer to other dry or moist substrates, made for example of a nonwoven material. The term "paper product" is intended also to refer to moist towelettes that are conventionally individually wrapped. In the exemplary embodiment of FIG. 1, the point-of-sale device 12 is in the form of a cash register, although it is contemplated that other integrated, single-component or multiple-component devices may be used instead, and still be considered a point-of-sale device within the scope of the present disclosure.

For example, and without limitation, another exemplary point-of-sale device (not shown) may be made up of a desktop computer, another non-portable device, or a portable device, such as a laptop computer, a mobile phone, or an electronic tablet, that is connected through a wired or wireless connection to a printer or some other output-generating component, configured to output portable displays containing information associated with particular transactions. The dispenser 14 of paper product 16 may be of any type typically found at food-selling establishments. In this regard, and as described in further detail below, the dispenser 14 may be configured to dispense individual napkins separated from one another, or may instead be configured to dispense paper from a roll that is supported totally or partially within the dispenser 14. Further, in embodiments in which paper is dispensed from a roll, the dispenser 14 may be configured to dispense a predetermined continuous length of paper, or may instead cut the predetermined length of paper into individual sheets at the time of dispensing. For example, specific embodiments of dispenser 14 may be configured to dispense a continuous sheet that is about 100 cm in length, while other embodiments may be configured to dispense 4 sheets, each having a length of about 25 cm.

The exemplary point-of-sale device 12 is configured to output portable displays in the form of slips 15 containing information associated with the food-selling transactions. More specifically, a slip 15 may be in the form of a receipt or proof-of-purchase document and contain, for example, the date and/or time of a particular transaction, a list of the one or more food items purchased, the name, address and/or other contact information for the establishment, and an indication of the form of payment. Notably, the point-of-sale device 12 in this embodiment is configured to also place (e.g., print, stamp, crimp) on the slip 15 specific indicia 20, schematically represented in FIG. 1, associated with the particular food-selling transaction for which the slip 15 was generated. Alternatively, the point-of-sale device 12 may be configured to generate slips 15 that contain only the specific indicia 20, while at least substantially obviating additional information. In that regard, the term "slip," as used herein, refers to a piece of paper or cardboard or similar flexible substrate (e.g., a tag, a sticker) or a substantially inflexible substrate (e.g., a reusable or disposable plastic card) generated by the point-of-sale device 12, and which contains information. A slip 15 may be intended for use by a customer of the food establishment or, alternatively, by personnel of the food establishment, and still fall within the scope of the present disclosure.

A contemplated exemplary use of the slip 15 is in a drive-through type purchase, such as is typically available at fast-food establishments, and in which the establishment has one or more windows staffed by one or more attendants. In that type of operation, a dispenser 14 may be located outside the establishment and accessible to customers from within their vehicles. In this regard, a customer may for example pay for the food being purchased at a first window, and pick up the purchased food items from a second window, with the customer receiving a slip 15 from the attendant at the first or second window. The customer may then proceed to another location in the designated vehicular path for drive-through purchases, to obtain paper product from a dispenser 14 that processes the information contained in the specific indicia 20 of slip 15. The dispenser 14 in that type of arrangement may be intended for direct interaction (i.e., self-service) with the customer, or may alternatively be staffed by another attendant of the food establishment, who is in charge of receiving slips 15 from customers and obtaining paper product from the dispenser 14 to give to customers.

With continued reference to FIG. 1, and further referring to FIGS. 2 and 3, the specific indicia 20 may be a machine-readable code, such as a linear (1D) barcode, a bi-dimensional (2D) barcode, or a tridimensional (3D) barcode. As used herein, the term "machine-readable code" refers to a code, symbol, or group of symbols that is conventionally decipherable by an electronic reader configured for that purpose, and which conventionally is not designed to be easily discerned and/or deciphered by an untrained human eye. In specific embodiments, a machine-readable code is in the form of a number and/or letter or a group of numbers and/or letters hidden among other numbers and/or letters that are easily identifiable by an electronic reader, but not easily identifiable by an untrained human eye. A machine-readable code, as the term is used herein, may also refer to a magnetic strip, an RFID tag, a smart tag, a hologram, or a microchip, for example, which may be located in a slip of the types described above. A "human-readable code," on the other hand, is used herein to refer to a code, symbol, or group of symbols that are easily readable/decipherable by the human eye. In this regard, a human-readable code may be an easily identifiable symbol or group of symbols, a letter or group of letters, or a number or group of numbers, or combinations of symbols, letters, and/or numbers that an untrained human eye may readily identify.

FIGS. 2 and 3 illustrate exemplary embodiments of slips 15a, 15b that may be generated by the point-of-sale device 12. FIG. 2, in particular, illustrates a slip 15a that includes specific indicia 20a in the form of a 2D barcode, which is of a suitably chosen type, such as, and without limitation, Aztec, QR, or Data Matrix. The exemplary specific indicia 20a is a machine-readable code and contains information that, as explained below, is used by the dispenser 14 to dispense a predetermined quantity of paper product 16, based on the food purchase for which the slip 15a was generated. The exemplary slip 15a also contains additional information, schematically represented therein and assigned numeral 23, that is associated with the particular sale transaction. The additional information may be any of the types described above (e.g., contact information for the food-selling establishment).

FIG. 3 illustrates yet another exemplary slip 15b, that includes specific indicia 20b in the form of a 1D barcode. The 1D barcode in this embodiment is also a machine-readable code and contains information similar to that described with reference to the specific indicia 20a in the embodiment of FIG. 2. Slip 15b also contains specific indicia 20c, which in this embodiment is in the form of a combination of numbers, but which may instead be a combination of letters, symbols or numbers different from those illustrated in that figure, and still fall within the scope of the present disclosure. Specific indicia 20c is a human-readable code that can be read by a user and entered, as explained more fully below, into a human interface of a dispenser 14. The dispenser 14, in response to the received human-readable code, dispenses a predetermined quantity of paper product 16, associated with the particular sale transaction for which the slip 15b was generated. Slip 15b also has additional information 23 (schematically represented in FIG. 3), similar to the identically numbered element 23 in FIG. 2. It is contemplated that a slip 15, 15a, 15b may have one or more types of specific indicia 20, 20a, 20b, 20c thereon which, alone or in combination, contain information that is entered by the user into the dispenser 14 for dispensing of a predetermined quantity of paper product 16.

With continued reference to FIGS. 1-3, the exemplary dispenser 14 (FIG. 1) has a sensor 24 located on a front face 14a of the dispenser 14, that is configured to read the specific indicia 20, 20a, 20b. In specific embodiments, the specific indicia 20, 20a, 20b is in the form of a 1D or 2D barcode, readable by the sensor 24, which is in the form of or otherwise includes a barcode reader/scanner. In use, a user 25 obtains a slip 15, 15a, 15b generated by the point-of-sale device 12, and which contains the specific indicia 20, 20a, 20b. When the user 25 is ready and wants to obtain paper product 16 from the dispenser 14, the user 25 waves the slip 15, 15a, 15b in front of the sensor 24, more specifically by placing the specific indicia 20, 20a, 20b in front of the sensor 24, until paper product 16 is dispensed by the dispenser 14. Alternatively, the dispenser 14 may generate a beep or actuate a light (not shown), to signal to the user 25 that the information from specific indicia 20 has been successfully received by the dispenser 14, and that paper product 16 is about to be dispensed.

In another embodiment, not shown, the user 25 inserts the slip 15, 15a, 15b into a slot associated with the sensor 24. Upon reading the specific indicia 20, 20a, 20b within the dispenser 14, the dispenser 14 dispenses the predetermined quantity of paper product 16 and either expels the slip 15, 15a, 15b back to the user 25, or alternatively permanently stores the slip 15, 15a, 15b in the interior of dispenser 14.

Dispensing of paper product 16 may be such that the user 25 is allowed to retrieve, from within the dispenser 14, a predetermined quantity of paper product. This is illustrated by the right-most portion of FIG. 1, in which the user 25 is shown pulling paper product 16, either from a roll mounted within dispenser 14, or from a stack of individual napkins supported in the interior of dispenser 14. To that end, and while not shown, dispenser 14 may have a mechanism that releases, for retrieval by a user, a predetermined length of paper product 16 from a roll supported totally or at least partially within the dispenser 14. In that regard, the user 25 may be able to pull paper product 16 (arrow 27) until a predetermined length of paper product 16 is reached, beyond which dispenser 14 would not allow the user 25 to pull any additional paper product 16. The user 25 may choose to retrieve from the interior of dispenser 14 the predetermined length of paper dispensed by dispenser 14, or may instead choose to retrieve (i.e., by pulling) less than that predetermined length, thereby leaving the rest available for retrieval by a subsequent user.

Alternatively, if dispenser 14 supports a stack of napkins in the interior thereof, the dispenser 14 may be configured to release a specified number of napkins that are retrievable by reaching into a dispensing mouth 14b of dispenser 14. When the maximum specified number of napkins is reached, no more napkins would be retrievable by the user 25 through dispensing mouth 14b. It is contemplated in that regard, that the user 25 may choose to retrieve from the interior of dispenser 14 the predetermined number of napkins dispensed by dispenser 14, or may instead retrieve fewer than that number, thereby leaving in the interior of dispenser 14 one or more napkins that are thus available for retrieval by a subsequent user.

Figure 6:
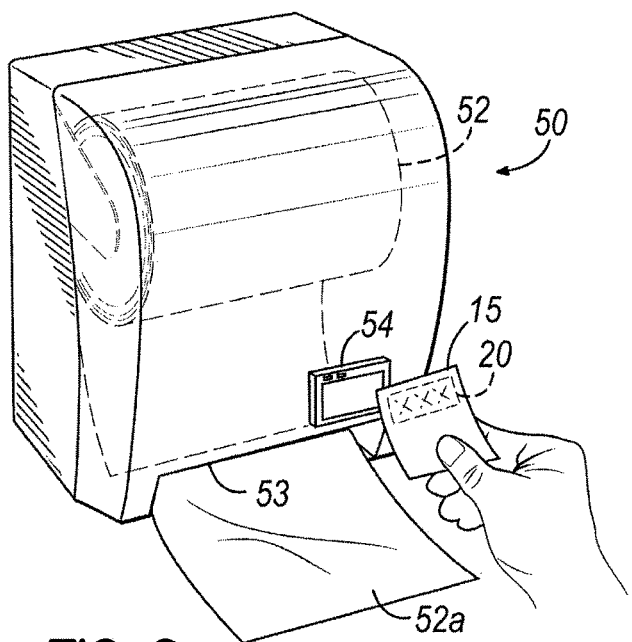
FIG. 6 is perspective view of a dispenser of paper product in accordance with yet another embodiment of the invention.

Referring now to FIGS. 4, 5, and 6, various types of paper product dispensers are illustrated in accordance with different embodiments of the invention. For ease of understanding, like reference numerals in those figures refer to similar features in any of those figures or in the preceding or subsequent figures. FIG. 4 illustrates an exemplary countertop napkin dispenser 30 having a dispensing mouth 30a for dispensing napkins 32 from a stack of napkins supported in the interior a main housing of dispenser 30. A sensor 34 is located on a sidewall 30b of dispenser 30, and is functionally similar to the sensor 24 associated with the embodiment of FIG. 1, the description of which may be referred to for an understanding of the functionality of sensor 34 as well. In that regard, sensor 34 is able to read specific indicia 20 placed on a slip 15. The location of the sensor 34 in dispenser 30 is merely exemplary rather than limiting, insofar as sensor 34 may instead be located on any of the other walls making up the main housing of dispenser 30, or be located in the interior of the main housing of dispenser 30, and accessible through a receiving slot. Likewise, FIG. 5 illustrates a tabletop napkin dispenser 40 that includes a sensor 44 on a sidewall 40a thereof, with that location being also exemplary rather than limiting. Sensor 44 is functionally similar to the sensors 24, 34 in the preceding figures, and is thus capable of reading specific indicia 20 from a slip 15 (FIG. 1). Tabletop napkin dispenser 40 dispenses napkins 32, through a dispensing mouth 42b, from a stack of napkins supported in the interior of dispenser 40.

With particular reference to FIG. 6, a wall-mounted dispenser 50 is illustrated that supports a roll 52 of paper in its interior and dispenses paper 52a through a dispensing mouth 53 located generally at the bottom of the dispenser 50. A sensor 54 is also located at the bottom of the dispenser 50, and is functionally similar to the sensors 24, 34, 44 of the preceding figures. In this regard, sensor 54 is configured to read specific indicia 20 from a slip 15 (FIG. 1), when the portion of the slip 15 containing the specific indicia 20 is held in front of sensor 54. In response to that reading, the dispenser 50 is configured to dispense a predetermined length of paper 52a, in accordance with the information obtained from the specific indicia 20. While not shown, it is contemplated that paper 52a may have perforations or otherwise frangible lines defining individual pieces of paper 52a.

Figure 7:
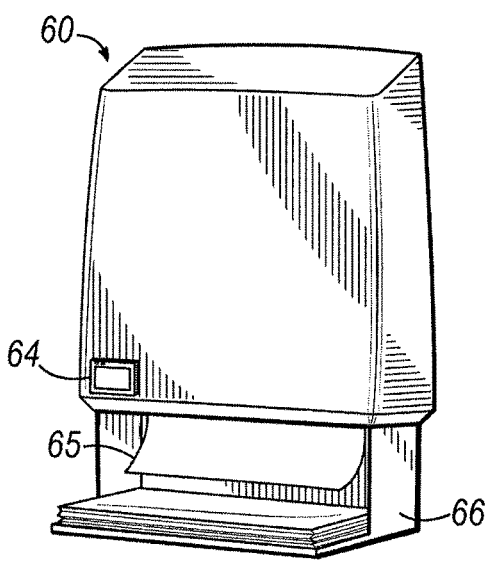
FIG. 7 is a perspective view of a dispenser of paper product in accordance with another embodiment of the invention.

FIG. 7 illustrates another exemplary wall-mounted dispenser 60, which may be able to dispense napkins from a stack of napkins supported in the interior of dispenser 60, or individual sheets automatically cut from a roll supported in the interior of dispenser 60. Dispenser 60 has a sensor 64 that is similar in function to sensors 24, 34, 44, and 54 of the preceding figures, and in this regard dispenses a predetermined number of sheets 65 (i.e., napkins or sheets cut from a roll) that are received on an exterior holding element or tray 66 of dispenser 60. In use, the user (not shown in this figure) places the specific indicia 20 from a slip 15 (FIG. 1) in front of sensor 64. In response, the dispenser 60 dispenses the sheets 65 by depositing them on tray 66, for retrieval by the user.

An exemplary roll-type dispenser suitable for use with the different aspects of this disclosure, and which dispenses a predetermined length of paper from a roll, is described in U.S. Pat. No. 6,704,616, entitled "Integrated Dispenser and Business Machine System." An exemplary napkin stack-type dispenser suitable for use with the different aspects of this disclosure, and which dispenses a predetermined number of napkins from a stack, is described in commonly-assigned U.S. Patent Publication No. 2010/0224647. The entire disclosures of those two publications are hereby expressly incorporated by reference herein.

Figure 8:
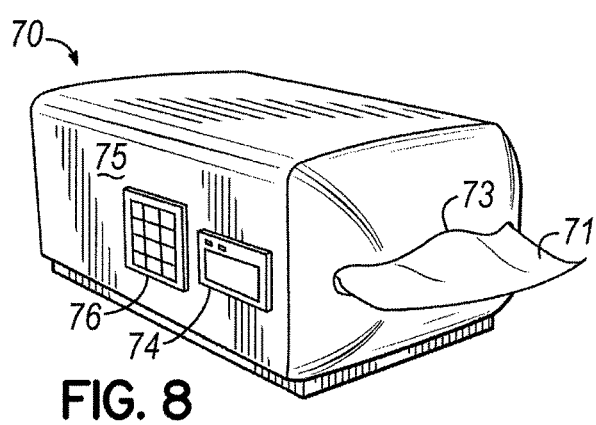
FIG. 8 is a perspective view of a dispenser of paper product in accordance with yet another embodiment of the invention.

Referring now to FIG. 8, another embodiment of a dispenser 70 is illustrated therein. Dispenser 70 dispenses napkins 71 through a dispensing mouth 73. A sensor 74 is located on a sidewall 75 of dispenser 70, and is functionally similar to the sensors 24, 34, 44, 54, and 64 of the preceding figures. Notably, dispenser 70 also includes a schematically-depicted human interface 76, which may for example be an alpha-numerical panel, a numerical panel, or another type of user-friendly panel that allows a user to manually enter information. It is contemplated that dispenser 70 may alternatively have only the human interface 76, thereby obviating the sensor 74. It is also contemplated that either or both of the sensor 74 and/or human interface 76 may be located elsewhere on the dispenser 70, with the locations shown in FIG. 8 being merely exemplary. The sensor 74 may, for example, be located in the interior of dispenser 70, and be accessible through a slot (not shown) into which the user 25 inserts a slip 15, 15a, 15b containing specific indicia 20, 20a, 20b (FIGS. 1-3).

With continued reference to FIG. 8, and referring again to FIGS. 1 and 3, a user 25 may for example be able to enter a human-readable code, such as a multi-digit number found on the slip 15, into the human interface 76. Alternatively or additionally, the user 25 may be able to select a symbol or group of symbols on the human interface 76, corresponding to the human-readable symbol or group of symbols found on slip 15. The human-readable code entered through human interface 76 into dispenser 70 is then processed by dispenser 70, as more fully explained below, to dispense a predetermined quantity of paper product 16. In specific embodiments, in which a slip 15 has two different types of specific indicia, such as specific indicia 20b and 20c on slip 15b (FIG. 3), a user 25 may be able to choose between having the sensor 74 read the machine-readable code (specific indicia 20b), or manually entering the human-readable code (specific indicia 20c) into the human interface 76.

Figure 9:
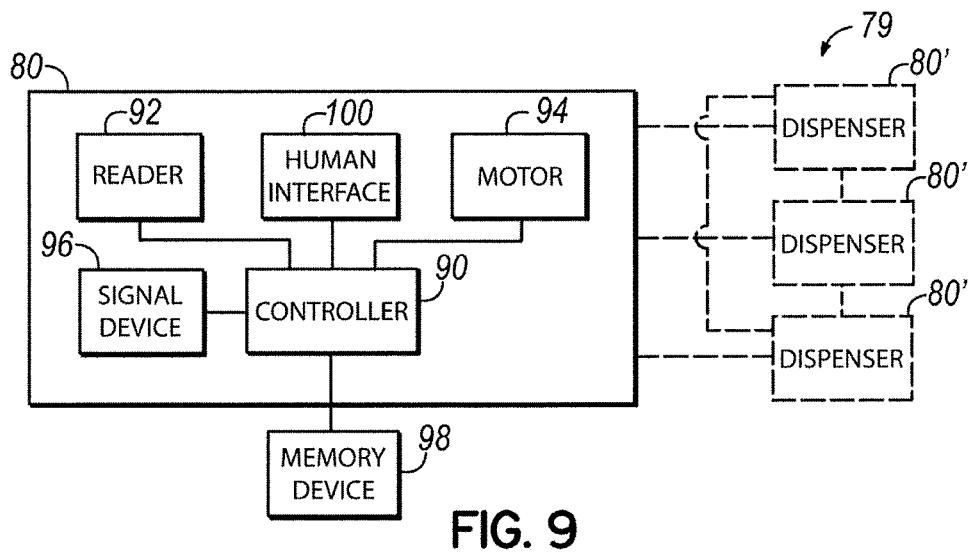
FIG. 9 is a schematic representation of different components of a system for dispensing paper product in accordance with one embodiment of the invention.

FIG. 9 schematically illustrates other aspects of an exemplary system 79 for dispensing paper product. That figure, and the description thereof, are applicable to roll-type dispensers, napkin stack-type dispensers, and other types of dispensers of paper product. System 79 includes a dispenser 80, which may be either a stand-alone dispenser or form part of a network of dispensers 80, 80' that are all interconnected to one another. While the components and functionality of various components are described with reference to one of the dispensers 80, 80', it is understood that one or more of those components or functional aspects may be found in some or all of the other dispensers 80, 80'.

The dispenser 80 has a controller 90 that receives and processes information, and executes commands, such as dispensing paper product or emitting signals to a user of the dispenser 80. To these ends, the controller 90 is operatively coupled to a reader (e.g., a barcode scanner) 92 that is configured to read machine-readable specific indicia 20, 20a, 20b from a slip 15, 15a, 15b (FIGS. 1-3), and also to a motor 94, the actuation of which causes a predetermined quantity of paper product to be dispensed. Additionally or alternatively, the controller 90 may be also operatively coupled to a signal device 96, such as a light-emitting element (e.g., diode) or a sound-emitting element that is actuated to let a user know when the machine-readable specific indicia 20, 20a, 20b from a slip 15, 15a, 15b (FIGS. 1-3) have been successfully obtained (e.g., read) by the dispenser 80.

With continued reference to FIG. 9, and referring back to FIGS. 1-3, system 79 also has a human interface 100, similar to the human interface 76 of FIG. 8, that allows a user to manually enter information read by the user from the human-readable specific indicia 20c (FIG. 3). Those of ordinary skill will readily appreciate that while the exemplary system 79 has a reader 92 and a human interface 100, alternative systems may be devised that include only one of those two features, or include additional features, similar to or different from reader 92 and human interface 100, that allow the dispenser 80 to acquire information from the surrounding environment. Such alternative systems are considered to fall within the scope of the present disclosure.

In operation, once information is received by the controller 90 from reader 92 or from human interface 100, the controller 90 accesses a memory device 98 (e.g., a random access memory device) that could be located inside the dispenser 80, located in another one of the dispensers 80', or at another location, so long as the memory device 98 is operatively coupled, and thus accessible, to controller 90. The memory device 98 in specific embodiments has a list that associates information contained in the specific indicia 20, 20a, 20b, 20c with a predetermined quantity of paper to be dispensed. For example, and without limitation, the memory device 98 may have a list of all possible specific indicia 20, 20a, 20b, 20c that could be generated by point-of-sale device 12, and a corresponding predetermined number of napkins or length of paper product to be dispensed. In a contemplated variation, the specific indicia 20, 20a, 20b, 20c may contain a specific number, letter, character or other symbol, or a string of those, that is sent by the controller 90 to the memory device 98. In that variation, the memory device 98 would have a list of that specific number, letter, character, symbol, or string, and a corresponding predetermined number of napkins or length of paper product to be dispensed.

In yet another example, and also without limitation, the specific indicia 20, 20a, 20b, 20c may contain a digit, at a specified location, that exactly corresponds to a number of napkins or to a length of paper product to be dispensed from a roll. In that embodiment, the controller 90 could obviate accessing the memory device 98 or any other memory device, and directly command the motor 94 to dispense the number of napkins (or length, in 6-inch increments for example) called out by that digit from the specific indicia 20, 20a, 20b, 20c. Those of ordinary skill in the art will readily appreciate that these exemplary processes for associating information contained in the specific indicia 20, 20a, 20b, 20c with a predetermined quantity of paper product to be dispensed are illustrative and therefore not intended to be limiting. Other such processes and schemes, with components similar to or different from those described herein are similarly contemplated, so long as they permit the dispenser to process the information obtained from the specific indicia 20, 20a, 20b, 20c to dispense a predetermined quantity of paper product. Such other processes and schemes are all considered to fall within the scope of the present disclosure.

The embodiments described herein obviate the need for employees of the food-selling establishment to carry out the task of collecting paper product for the customers, insofar as customers are able directly feed information into the dispenser and to collect the paper product themselves. This, of course, represents a time-saving measure for the establishment, which speeds up service and may therefore lead to increased customer satisfaction. It is understood, however, that the food establishment may instead designate specific personnel for the dispensing of paper product, who carry out the task of waving the specific indicia 20, 20a, 20b, 20c in front of a dispenser so as to obtain the predetermined quantity of paper product out of a dispenser.

The embodiments described herein allow customers to get the paper product they need at a time of their choosing, rather than at the same time that the food is dispensed. This may be desirable, for example, in situations in which the purchased food item includes a drink, which would otherwise cause a paper product dispensed with the drink to become wet (by spilling or by condensation—in the case of cold drinks). In addition to the above, the embodiments described herein may allow a customer to obtain paper product from a dispenser of their choosing. For example, a customer may wish to obtain paper product from a dispenser that is located near or sitting on a table occupied by the customer. In another example, a customer may wish to obtain paper product of a specific form, dispensed by one type of dispenser, rather than from other dispensers dispensing other forms of paper product. A customer may, for instance, choose to obtain napkins from a napkin dispenser, rather than a continuous length of paper from a roll supported within a roll-type dispenser, or pre-cut sheets from a roll also dispensed by a roll-type dispenser. In this regard, the exemplary network of dispensers 80, 80' schematically depicted in FIG. 9 would permit such type of use. More specifically, the dispensers 80, 80' depicted in FIG. 9 may all be of the same type or may include dispensers of different types, thereby dispensing different types of paper product in predetermined quantities.

In embodiments having a single dispenser 80 available (rather than a network of dispensers 80, 80'), it may be desirable for a customer to be able to obtain the predetermined quantity of paper product only once. In this regard, the dispenser 80 is configured to acquire the specific indicia through the reader 92 or through the human interface 100) every time the specific indicia is waved in front of the reader 92 or manually entered, but the controller 90 is able to determine whether the predetermined quantity of paper product has already been dispensed for a specific purchase. For example, and without limitation, a configuration is contemplated in which, upon receiving information from a reader 92 or human interface 100, a unique identifier of the purchase transaction found in the specific indicia 20, 20a, 20b, 20c is compared to an existing list (stored in memory device 98, for example) of unique identifiers. If the controller 90 finds the newly-received unique identifier to be already on the list, it denies the dispensing of paper product. In this regard, the controller 90 may command the signal device 96 to emit a signal to the user, indicative of such denial.

In embodiments having a network of dispensers 80, 80', it may be advantageous to make the memory device 98 in each of the dispensers 80, 80' of the network available to the controllers 90 of all other dispensers, to prevent customers from getting the predetermined quantity of paper product from one of the dispensers 80, 80' and then also from another one of the dispensers 80, 80'. To this end, embodiments are also contemplated of systems in which the dispensers 80, 80' share one common memory device 98, which may be associated with a particular dispenser 80, 80' or external to all dispensers 80, 80', and/or a common controller 90, which also may be associated with a particular dispenser 80, 80' or external to all dispensers 80, 80'.

Figure 10:
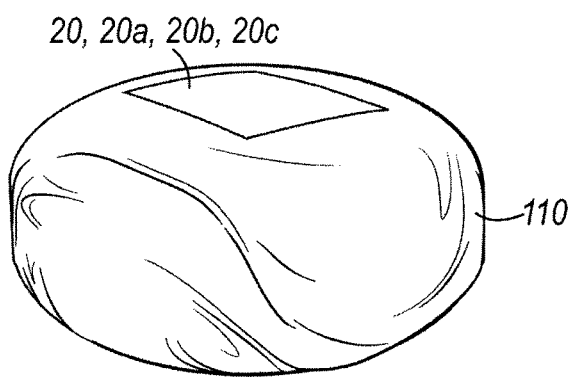
FIG. 10 is a perspective view of an exemplary portable display in accordance with an embodiment of the invention.
Figure 11:
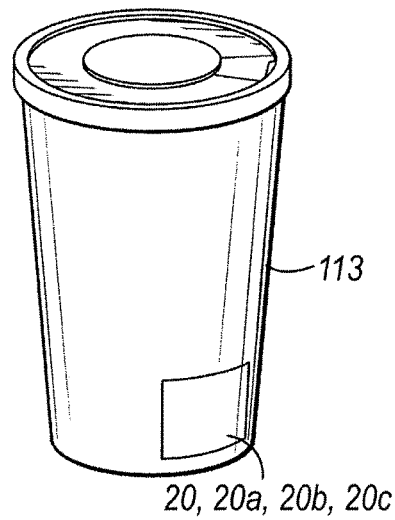
FIG. 11 is a perspective view of an exemplary portable display in accordance with another embodiment of the invention.

While the embodiments described above include the point-of-sale device 12 generating a portable display in the form of a machine-readable code or a human-readable code on a slip 15, 15a, 15b, it is contemplated that the point-of-sale device 12 may instead generate other types of portable displays, all falling within the scope of the present disclosure. For example, and without limitation, specific indicia 20, 20a, 20b, 20c could be placed (e.g., printed, stamped, crimped) on a packaging element (e.g. wrapper, box, container) associated with the food item being purchased or associated with the totality of items being purchased in a transaction. This is schematically shown in FIGS. 10 and 11, in which each of a hamburger wrapper 110 (FIG. 10) and a coffee cup 113 (FIG. 11) has specific indicia 20, 20a, 20b, 20c thereon. The user would in that case place the specific indicia 20, 20a, 20b, 20c that is on the packaging element in front of the reader (e.g., reader 92 in FIG. 9) or otherwise enter information from the specific indicia 20, 20a, 20b, 20c into a dispenser through a human interface (e.g., human interface 100 in FIG. 9) of the dispenser (e.g., 80, 80' in FIG. 9). In response, the dispenser 80, 80' would dispense a quantity of paper product associated with the specific indicia 20, 20a, 20b, 20c on the hamburger wrapper 110 of FIG. 10 or on the coffee cup 113 of FIG. 11.

With continued reference to FIGS. 10 and 11, and further referring back to FIG. 1, it is contemplated that the point-of-sale device 12 may have a printer or similar element (not shown) that is able to place the specific indicia 20, 20a, 20b, 20c on the hamburger wrapper 110 or coffee cup 113, with the specific indicia 20, 20a, 20b, 20c being associated with the totality of the transaction. For example, the point of sale device 12 may have a printer that prints a sticker containing the specific indicia 20, 20a, 20b, 20c. Alternatively, and particularly useful for single-item purchases, specific indicia 20, 20a, 20b, 20c may be pre-placed (e.g., pre-crimped, pre-printed, pre-stamped) on a packaging element (e.g., hamburger wrapper 110 or coffee cup 113), such that, upon completion of or during the sale transaction, the point-of-sale device 12 executes a command signaling the cashier to use a specific packaging element of that type.

Figure 12:
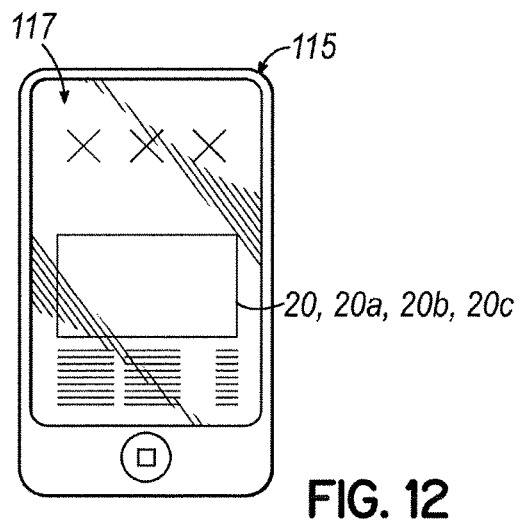
FIG. 12 is a perspective view of an exemplary portable display in accordance with yet another embodiment of the invention.

Yet in another example, illustrated in FIG. 12, the point-of-sale device 12 may send information to a mobile device 115 such as a phone (e.g., a "smart phone"), a laptop computer, or an electronic tablet, that results in the generation of a portable display in the form of an image 117 on the mobile device 115. The image 117 would contain specific indicia 20, 20a, 20b, 20c of the types described above with respect to the other embodiments disclosed herein. This may be accomplished, for example, through the use of a specific readily available application (an "app") pre-installed in the mobile device 115. When the user wishes to obtain paper product from a dispenser, the user places the image 117 that is on the mobile device 115 in front of a reader (e.g., reader 92 in FIG. 9) or otherwise enters information from the specific indicia 20, 20a, 20b, 20c into a dispenser through a human interface (e.g., human interface 100 in FIG. 9) of the dispenser. In response, the dispenser 80, 80' (FIG. 9) would dispense a quantity of paper product associated with the food item or items purchased, and for which the image 117 was generated.

Advantageously, the embodiments herein described permit food establishments to provide customers a quantity of paper product that is in accord with the type and/or quantity of food purchased. In this regard, the systems herein described may be configured to dispense a small quantity of paper product for a food item that can be consumed without requiring much clean-up of the user's face or hands (e.g., a cup of coffee), and dispense a larger quantity of paper product for a messier food item, such as ice-cream. Similarly, it is contemplated that, as a matter of courtesy, a food establishment may configure a point-of-sale device 12 to generate a portable display having specific indicia 20, 20a, 20b, 20c, associated with a courtesy-quantity of paper product to be dispensed by a dispenser, upon request by a customer.

While the above embodiments describe a food retail operation, the principles described herein are not so limited. More specifically, the same type of systems, processes and components may be used in any other type of retail operation or similar, in which there is a need to dispense a predetermined quantity of paper product depending on the type of purchase made.

From the above disclosure of the general principles of the present invention and the preceding detailed description of exemplary embodiments, those skilled in the art will readily comprehend the various modifications to which this invention is susceptible. Accordingly, this invention is intended to be limited only by the scope of the following claims and equivalents thereof.

What is claimed is:

1. A system for dispensing paper product, comprising:
a point-of-sale device for entering details of a particular food sale transaction, said point-of-sale device being located in a food-selling establishment and configured to output a slip containing specific indicia associated with the particular food sale transaction; and
a dispenser of paper product configured to obtain information from the specific indicia on the slip and to dispense a predetermined quantity of napkins, paper towels, or moist towelettes in response to the obtained information, said dispenser being located in the food-selling establishment remotely from said point-of-sale device.

2. The system of claim 1, wherein said point-of-sale device is configured to place on the slip machine-readable indicia, and said dispenser is configured to read the machine-readable indicia to thereby obtain the information.

3. The system of claim 2, wherein said point-of-sale device is configured to place on the slip indicia in the form of a barcode, and said dispenser has a barcode reader configured to read the barcode to thereby obtain the information.

4. The system of claim 1, wherein said point-of-sale device is configured to place on the slip indicia in the form of a human-readable code, and said dispenser includes a human interface for entering the human readable code, said dispenser being configured to dispense the predetermined quantity of napkins, paper towels, or moist towelettes in response to information obtained through said human interface.

5. The system of claim 1, wherein said dispenser is configured to dispense napkins, paper towels, or moist towelettes from a roll mounted therein, said dispenser being further configured to dispense a predetermined length thereof from the roll in response to the obtained information.

6. The system of claim 1, wherein said dispenser is configured to obtain information from the specific indicia more than once, said dispenser being further configured to dispense the predetermined quantity of napkins, paper towels, or moist towelettes only the first time the information is obtained from the specific indicia.

7. The system of claim 1, wherein said dispenser includes a tray, said dispenser being configured to deposit the predetermined quantity of napkins, paper towels, or moist towelettes onto said tray in response to the obtained information.

8. The system of claim 1, wherein said dispenser is configured to make the predetermined quantity of napkins, paper towels, or moist towelettes retrievable by a user thereof from within said dispenser in response to the obtained information.

9. The system of claim 1, wherein said point-of-sale device is a cashier register.

10. The system of claim 1, wherein said dispenser is one of a plurality of interconnected dispensers, each configured to obtain information from the specific indicia on the slip and to dispense a predetermined quantity of napkins, paper towels, or moist towelettes in response to the obtained information.

11. The system of claim 1, wherein the particular sale transaction involves a sale of at least one non-paper item.

12. A system for dispensing napkins, comprising:
a register for entering details of a particular food sale transaction, said register being located in a food-selling establishment and configured to output a slip containing a barcode associated with the particular food sale transaction; and
a dispenser of napkins configured to read the barcode from the slip and to dispense a predetermined number of napkins in response to the read barcode, said dispenser being located in the food-selling establishment remotely from said register.

13. A system for dispensing paper product, comprising:
a point-of-sale device for entering details of a particular food sale transaction, said point-of-sale device being located in a food-selling establishment and configured to output a portable display containing specific indicia associated with the particular food sale transaction; and
a dispenser of paper product configured to obtain information from the specific indicia on the display and to dispense a predetermined quantity of napkins, paper towels, or moist towelettes in response to the obtained information, said dispenser being located in the food-selling establishment remotely from said point-of-sale device.

14. The system of claim 13, wherein the display is located on a packaging element associated with a food item sold as part of the particular sale transaction.

15. The system of claim 13, wherein said point-of-sale device is configured to generate an image on a mobile device, said image including the specific indicia, and said dispenser is configured to read the specific indicia on the mobile device and to dispense a predetermined quantity of napkins, paper towels, or moist towelettes in response to the obtained information.

\* \* \* \* \*